May 10, 1966  R. J. OSBORNE ETAL  3,250,315
VAPOR IMPINGEMENT HEATING

Filed April 8, 1963  7 Sheets-Sheet 1

FIG. I

INVENTORS
ALFRED GRANT BAUM
ROBERT JARVIS OSBORNE
BY
*William D. Dunlap*
ATTORNEY May 10, 1966

R. J. OSBORNE ET AL 3,250,315

VAPOR IMPINGEMENT HEATING

Filed April 8, 1963

*INVENTORS*
ALFRED GRANT BAUM
ROBERT JARVIS OSBORNE
BY

*William H. Drucker*

ATTORNEY

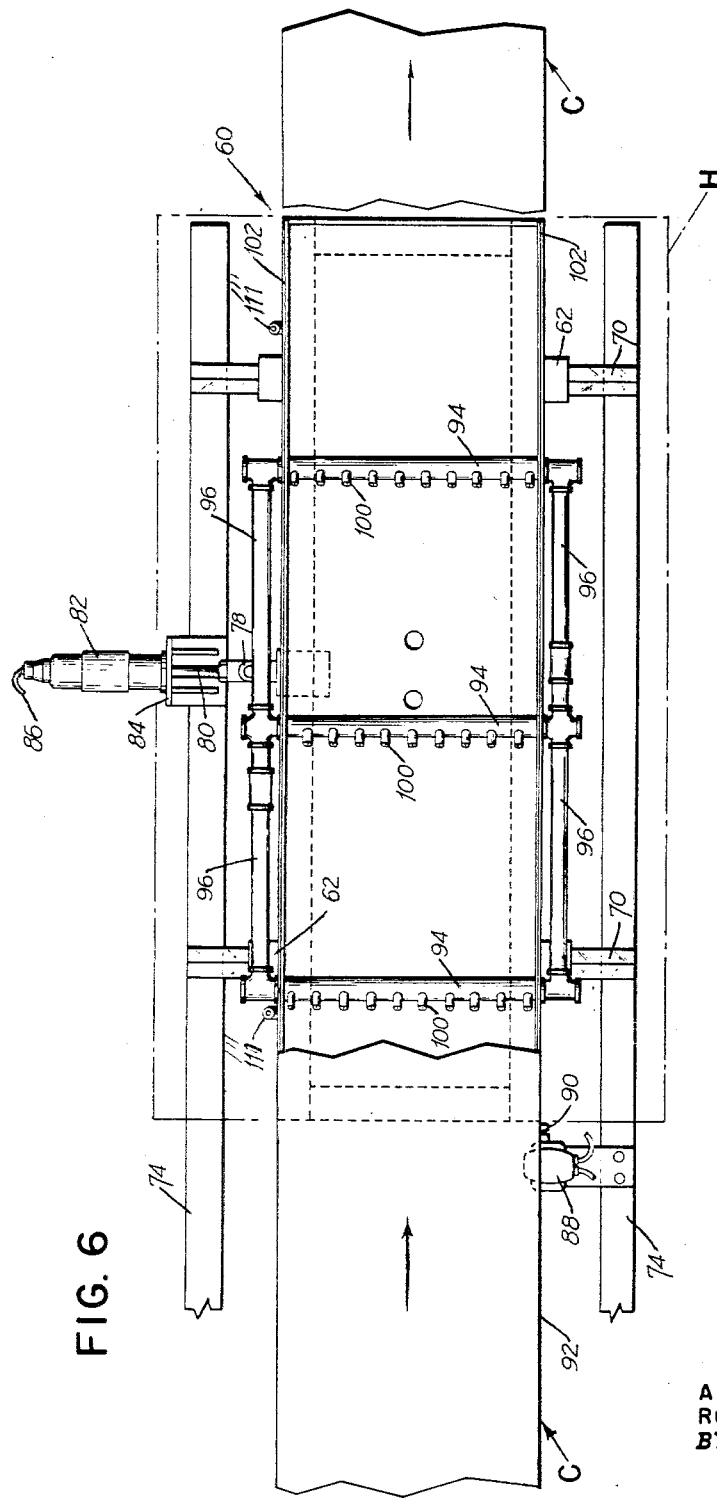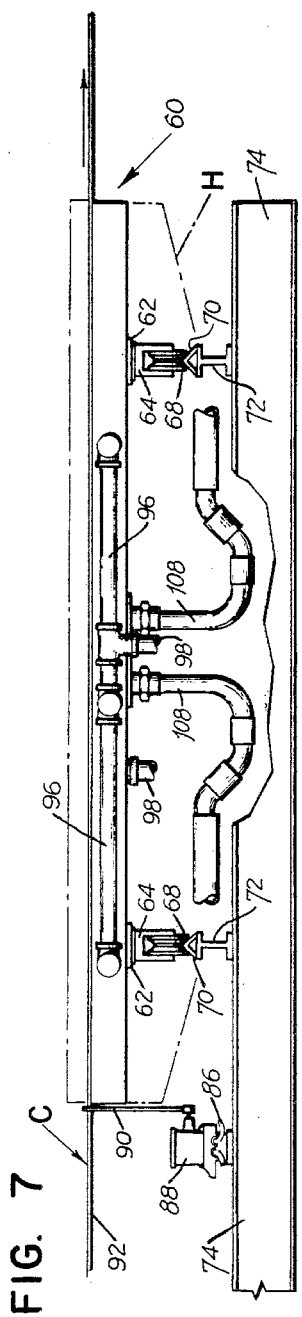
FIG. 6
FIG. 7
INVENTORS
ALFRED GRANT BAUM
ROBERT JARVIS OSBORNE
BY
ATTORNEY May 10, 1966 R. J. OSBORNE ETAL 3,250,315
VAPOR IMPINGEMENT HEATING
Filed April 8, 1963 7 Sheets-Sheet 6

INVENTORS
ALFRED GRANT BAUM
ROBERT JARVIS OSBORNE
BY

ATTORNEY

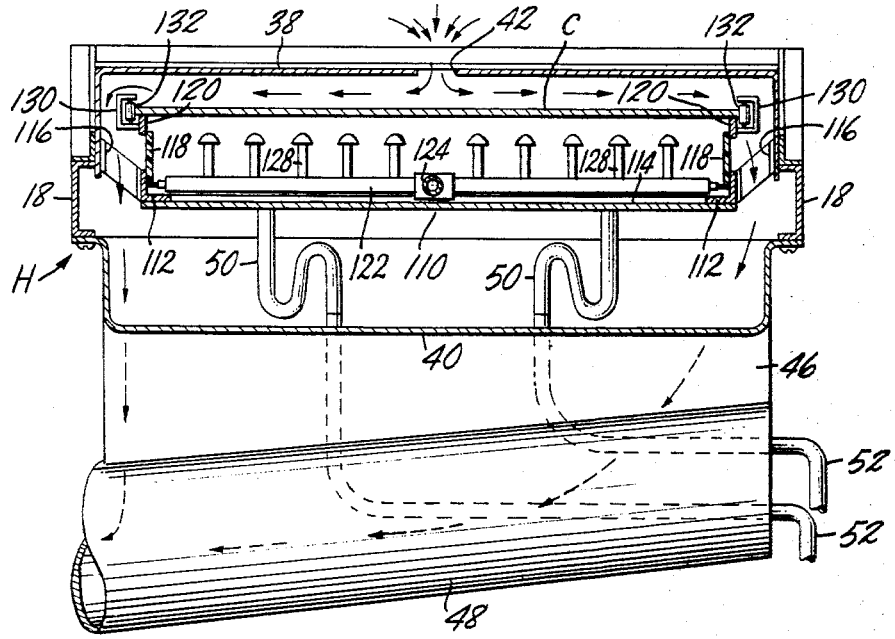
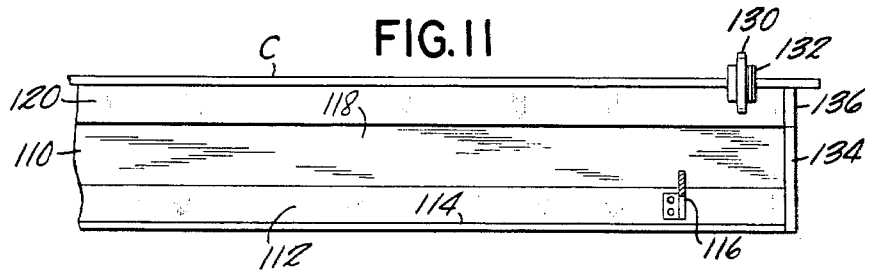
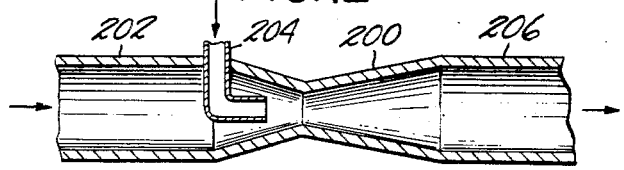

United States Patent Office 3,250,315
Patented May 10, 1966

3,250,315
VAPOR IMPINGEMENT HEATING
Robert Jarvis Osborne and Alfred Grant Baum, Fairfield, Conn., assignors to American Machine & Foundry Company, a corporation of New Jersey
Filed Apr. 8, 1963, Ser. No. 271,190
3 Claims. (Cl. 165—1)

This invention relates to a method of drying laminar material and to apparatus therefor. More particularly, the invention relates to low temperature steam drying by heating the underside of a conveyor carrying material to be dried.

Many products, and particularly flavor sensitive materials such as food and tobacco, require either partial or complete drying at modest temperatures during manufacture or processing. Steam drying offers a particularly convenient form of temperature control. Moreover, steam drying is generally inexpensive in comparison with ordinary oven drying and may require much less capital equipment when a source of steam is at hand.

Therefore, it is an object of this invention to provide a method of steam drying by indirect heating.

It is also an object of this invention to provide a method of inexpensively and conveniently heating and drying a sheet with condensing steam at a temperature below that of saturated steam at atmospheric pressure.

According to the invention, a large variety of wet materials can be continuously dried by steam or other vapor heat. Drying includes not only moisture removal, but also the evaporation of any constituents which are volatile under the operating conditions of this method and device. For example, tobacco particles suspended in a viscous liquid adhesive preparation may be spread upon a steel conveyor belt and formed into a wet slurry film. Drying or partial drying of the film transforms it into a continuous sheet or web similar to paper or natural tobacco leaf.

When material to be dried is spread on a conveyor or belt, the conveyor may be passed over a steam heated space in which heat is transferred through the bottom surface of the conveyor and the underside of the layer of material thereon is heated when the steam is condensed thereon and gives up its latent heat. When the layer is thin, heat passes easily up through the entire mass. A moving current of air or other gas sweeps away the evaporated water or other liquid which may be passed to a solvent recovery system if desired.

In ordinary impingement dryers only the specific heat is ordinarily recovered from the heating gas. In the present invention the steam is condensed and gives up both specific and latent heat and thereby provides a very efficient heat transfer method, far more effective than simply blowing hot gas against a surface to be heated. The highly efficient heat exchange provided in this invention allows the fabrication of very small compact machinery for a given length of drying surface. More drying can be done with the steam than with air at low temperatures, and thus heat sensitive materials can be more efficiently dried at low temperatures such as 200° F. For a given length of drying the condensing steam at 200° F. will be equal to the use of air at 7–800° F. in drying capacity.

A feature of the invention is the suspension of the steam box in combination with means for tracking the box relative to the conveyor to reduce steam and vapor loss.

Another feature of the invention is the provision of a steam box having a flexible upper portion with means for tracking the upper portion of the steam box relative to the conveyor so that the upper portion of the steam box follows the conveyor to reduce steam and vapor loss.

Details of construction and the operating steps are more particularly described by the following account taken with the drawing.

In the accompanying drawing similar reference characters relate to corresponding elements and:

FIG. 6 is a plan view of a steam box in conjunction with a modified band conveyor tracking structure;

FIG. 7 is a side elevation of the device shown in FIG. 6;

FIG. 10 is a sectional end elevation of a further modified band conveyor tracking structure.

FIG. 11 is a side view of a fragment of the band conveyor and the end of the steam box according to FIG. 10; and FIG. 12 is a longitudinal section through an eductor which mixes air and saturated steam.

Figure 1:
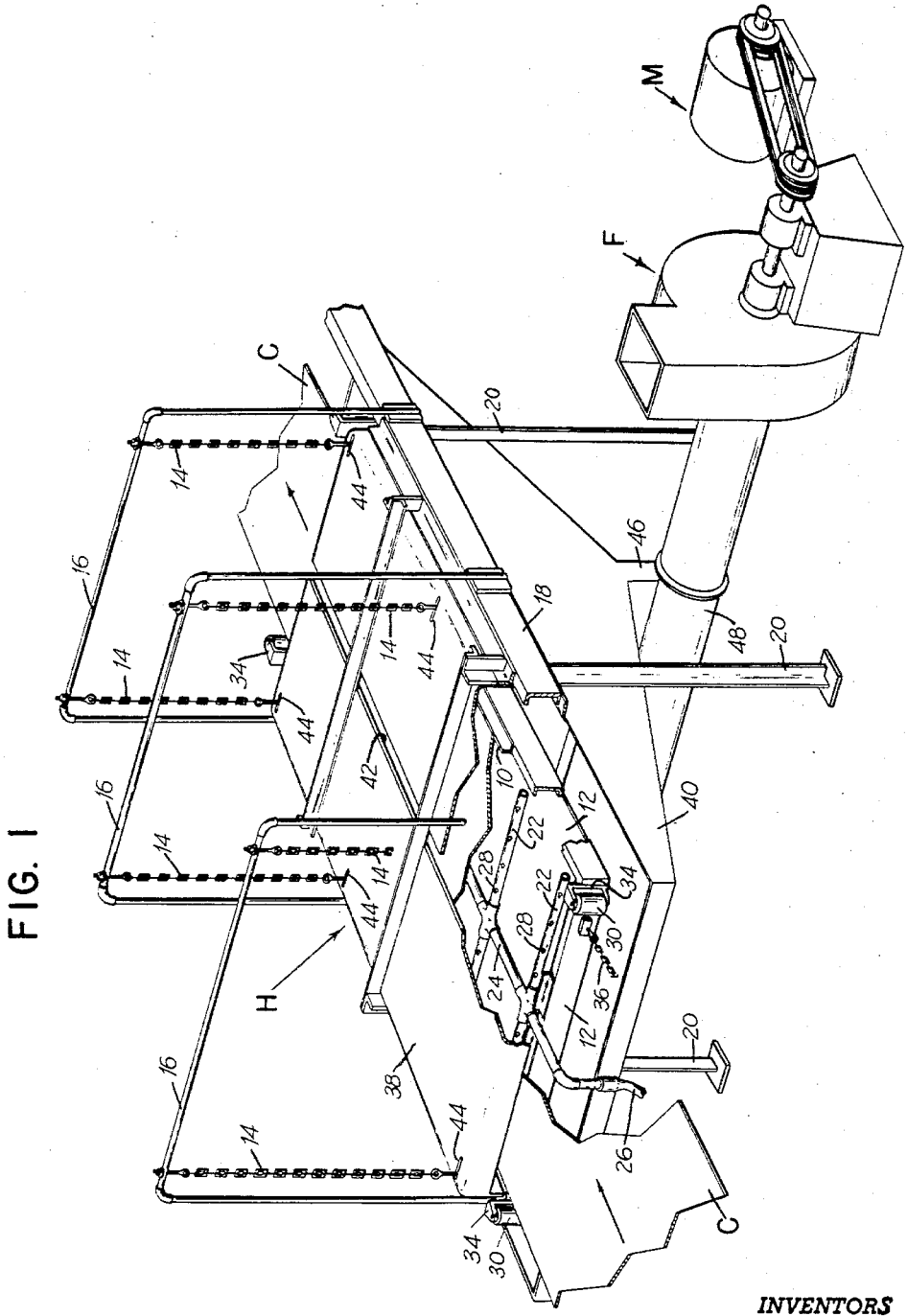
FIG. 1 is an isometric view of a preferred form of the invention illustrating a portion of an endless band conveyor surrounded by a downdraft suction housing. The band passes over and is heated from below by steam condensing in a steam box suspended within the suction housing.

Referring to the drawing and particularly to the preferred embodiment of FIG. 1, the endless band conveyor slides over the top edges 10 of the vertical sides and ends of a steam box 12. The box 12 is suspended by means of a plurality of chains 14 from a plurality of U-shaped frame members 16 secured to a pair of spaced horizontal frame members 18 which in turn are provided with suitable legs 20 for support of the structure.

Within the box 12 are suitably mounted a plurality of transverse tubes 22, all of which are connected to a longitudinal pipe 24 at their center portion. The pipe 24 projects from said box and by a suitable tube 26 is connected to a source of steam (not shown). Each transverse tube 22 is provided with a plurality of jets or nozzles 28 ejecting streams of steam against the underside of the band conveyor C as the latter passes over the steam box 12. This results in an efficient heating of the underside of band conveyor C.

Figure 2:
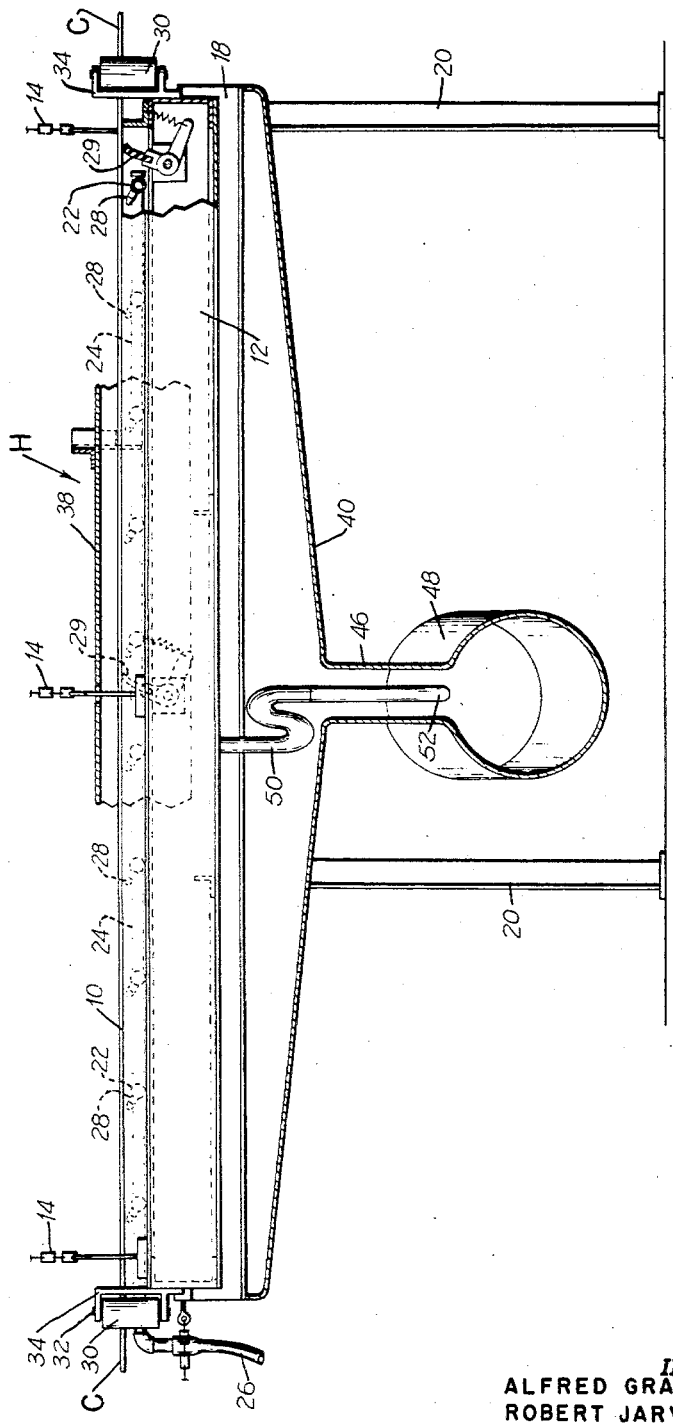
FIG. 2 is a sectional side elevation of the structure shown in FIG. 1.
Figure 3:
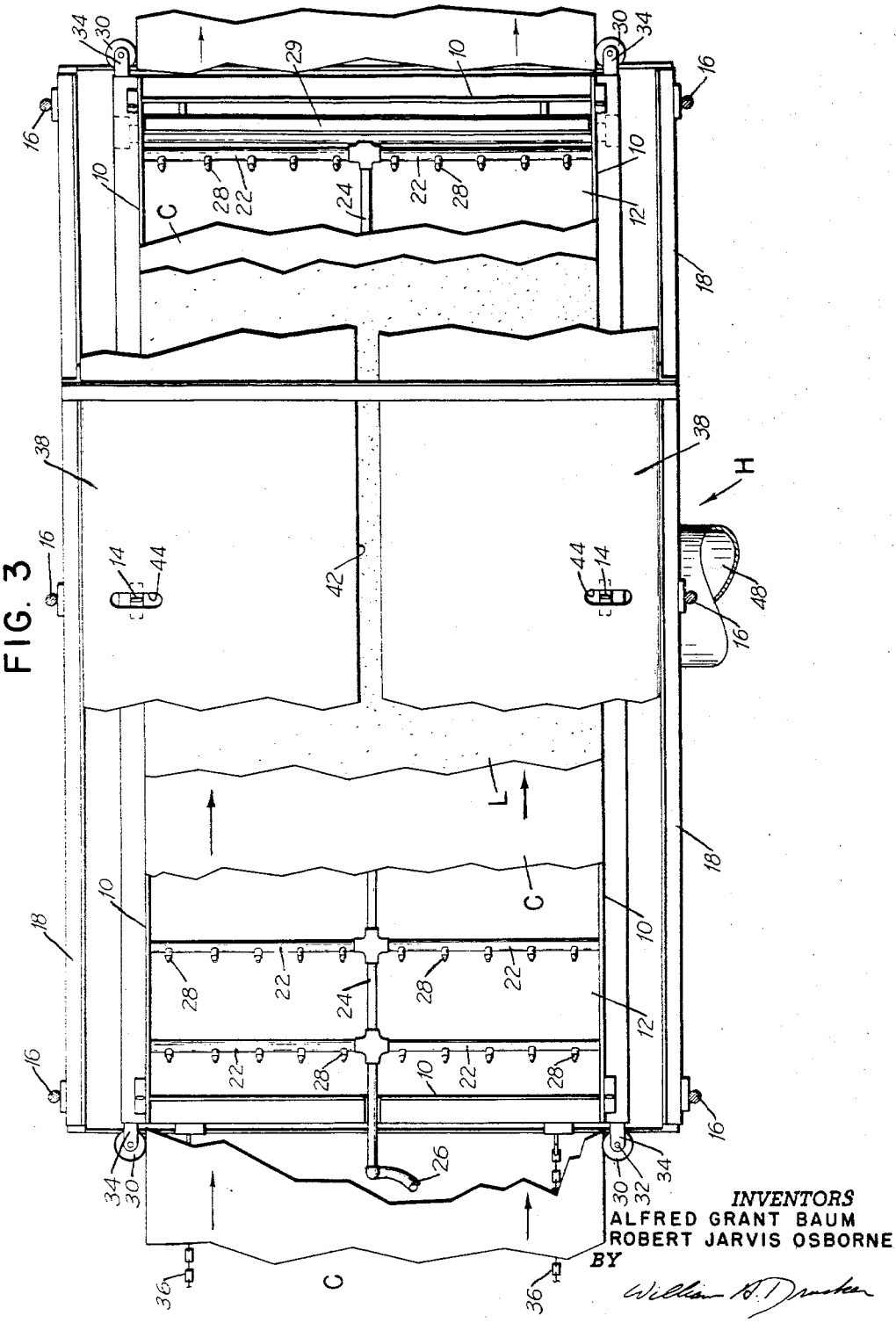
FIG. 3 is a plan view of the structure of FIG. 1 partly shown in section.

The width of the band conveyor C is substantially the same as the width of the steam box 12, and since the upper edges of the latter are comparatively narrow, a uniform heating of the entire width of the band conveyor C is effected. Condensation, which may adhere to the underside of said band conveyor and impair the uniformity of the heating of the band, is wiped off by a plurality of suitable, spring urged squeegees 29 (FIG. 2) conveniently mounted within the steam box 12. Condensate is also blown off the belt by impinging steam directed by the suitably arranged nozzles 28.

In order to keep the moving band conveyor C in constant alignment contact with the narrow upper edges 10 of the steam box 12, the latter carries two pairs of tracking or aligning rollers 30 (FIGS. 1, 2, 3 and 5) each of which is mounted to rotate on a vertical shaft 32 held by a bracket 34. One pair of brackets 34 is secured to one end wall of the steam box 12, while the other pair is mounted at the other end of the box. Two pairs of rollers 30 are located to engage the side edges of the band conveyor C at both ends of the steam box 12, so that the band conveyor C remains in register with the box 12. Lateral swaying motion of the conveyor C is transmitted to the suspended steam box by the tracking rollers 30. To prevent forward motion or drag of the steam box 12 in the direction of the band conveyor travel, anchor chains 36 are secured at one end of the backward part of the steam box, while the other ends of said chains are fastened to suitable stationary posts (not shown).

Figure 4:
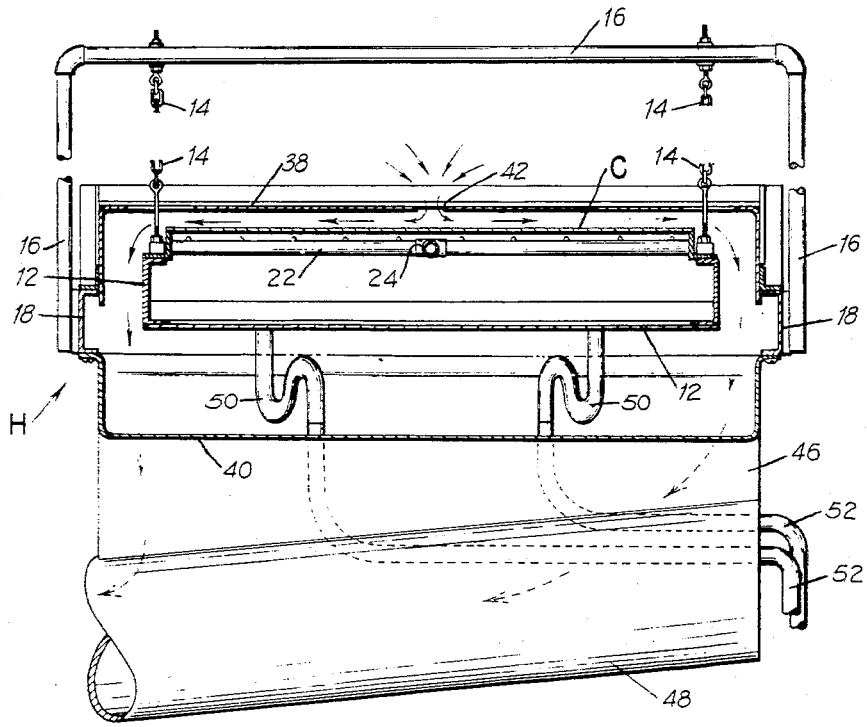
FIG. 4 is a sectional end elevation of the structure of FIG. 1.
Figure 5:
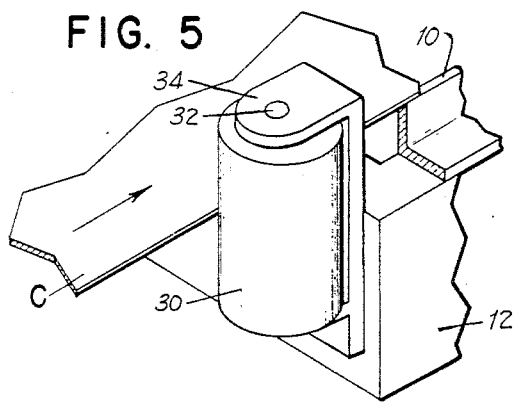
FIG. 5 is an isometric illustration of the lateral tracking means for the endless band conveyor of FIG. 1.

That portion of the band conveyor C which passes over the steam box 12 and the steam box itself are surrounded by a downdraft suction housing H which consists of an upper housing 38 and a lower housing 40. The upper housing 38 is secured to the two horizontal frame members 18, and the central portion in its entire length is provided with a longitudinal slot 42. The upper housing 38 is also provided with a plurality of short transverse slots 44 which permit the chains 14, carrying the steam box 12, to protrude freely through the upper housing. The lower housing 40 is also mounted upon the horizontal frame members 18 and at its central bottom portion is provided with a vertical rectangular transverse duct 46 which connects with the upper portion of a large indirect transverse suction tube 48. The tube 48 is closed at one end, and the other end of the tube is connected to a suction fan F (FIG. 1) rotated by a conventional motor drive unit M. In order to expel condensation from the steam box 12, the box is provided at its bottom portion with a pair of condensate collection pipes 50. The pipes 50 are connected to flexible hoses 52 which in turn are led to the outside of the machine through the end wall of the suction tube 48 as illustrated in FIG. 4.

In operation the layer L of material cast on the band conveyor C is uniformly and continuously dried as the latter passes over the steam box 12. The steam in the box heats the underside of the band conveyor C while dry air enters the longitudinal slot 42 of the upper housing portion 38 and is drawn crosswise over the layer L on top of the band and down into the lower portion 40 by the suction fan F. Tracking of the steam box 12 by rollers 30 relative to the traveling band conveyor C assures a fairly tight seal of the steam box 12 and band conveyor C. This provides an efficient heating device for use at a comparatively low temperature.

The dry air entering longitudinal slot 42 of the upper housing portion 38 is particularly effective in removing moisture from the material cast on conveyor C. Air blowing over moist and heated material on belt C rapidly picks up moisture. As this air picks up moisture, its rate of moisture removal sharply drops. Therefore, the short moisture removal path of the apparatus of this invention, which is but slightly longer than one-half the width of belt C, allows a larger quantity of dryer air to contact and more rapidly remove moisture from the material being dried.

If it is desired, the air drawn through slot 42 may be preheated up to 300° F., although best results are obtained by preheating the air between 175° F. and 250° F. If an inert gas, another gas, or air is drawn or blown over the material on conveyor C, this gas or air may be recycled and cooled to recover the moisture from it. If non-aqueous solvents are used to cast the material on conveyor C, an inert drying gas such as nitrogen or carbon dioxide will not only prevent oxidation of the material being dried, but it will prevent the explosion of fumes from the non-aqueous solvents.

While air or other gases have been shown being drawn downward about conveyor C, the air or other gases could be blown through the longitudinal slot 42. For the best results, it is desirable that the drying atmosphere pass over the material on conveyor belt C with a relative velocity of between 500 to 2500 feet per minute. A velocity of the drying atmosphere of over 2500 feet per minute can blow the wet material off the conveyor.

Saturated steam at atmospheric pressure within the steam box 12 will be at a temperature of 212° F. When it is desired to heat conveyor belt C to a temperature below that of saturated steam at atmospheric pressure, the steam entering steam box 12 may be mixed with air or recycled noncondensed and noncondensible vapor to reduce the temperature of the resulting mixture and then the resulting cooler mixture may be used as the heat transfer medium. The condensation of the steam at a reduced partial pressure is the main source of heat at the lower temperature. The nozzles 28 direct the steam or the steam and air mixture against the bottom of conveyor belt C so that the velocity of the steam may be used to increase the film coefficient at the surface of belt C by the rapid removal of condensed liquid as well as by the removal of blanketing noncondensible vapors.

As shown in FIG. 12, steam may be passed into the eductor 200 from the steam pipe 202. Air is drawn into and mixed with the steam through the tube 204. Pipe 206 leading from eductor 200 is connected to the tube 26. The temperature of the gas stream issuing from eductor 200 may be easily controlled by varying the relative quantities of steam and air which are mixed. For temperatures only slightly above room temperature, it may be necessary to pressurize the air stream entering tube 204 in order to obtain sufficient diluting air to reduce the temperature of the resulting mixture to the desired degree.

As an example, if steam box 12 is to be heated to 190° F., 0.91 lb. of dry air at 70° F. should be mixed with each pound of 35 p.s.i.a. saturated steam. The mixture will provide saturated air at 190° F. Heat transfer will take place by condensation of moisture from the saturated air at its dew-point of 190° F.

In a similar manner, 2.31 lb. of dry air at 70° F. may be mixed with each pound of 103 p.s.i.a. saturated steam to provide 170° F. saturated air. Both the aforementioned mixtures, which produce saturated air, will not have any liquid water present in them.

However, saturtaed air at 190° F. may be obtained with some liquid water present by adding to each 1.005 lb. of 30 p.s.i.a. saturated steam 0.91 lb. of 70° F. dry air. The resulting mixture has 1.91 lb. of saturated air at 190° F. plus 0.005 lb. of liquid water at 190° F. In a like manner, saturated air at 170° F. may be produced my adding 1.0231 lb. of 30 p.s.i.a. steam to 2.31 lb. of dry air at 70° F. to produce 3.31 lb. of saturated air at 170° F. containing .0231 lb. of liquid water.

While it may not always be possible to produce saturated air at moderate temperatures with low pressure steam (up to 30 p.s.i.), it is easy to produce saturated air at low temperatures containing small quantities of liquid to achieve the same results of good heat transfer. As an example, to produce liquid free saturated air at 150° F. by simply mixing saturated steam and 70° F. dry air is not possible. However, if 1.0501 lb. of 30 p.s.i.a. saturated steam is added to 4.7 lb. of dry air at 70° F., 5.7 lb. of saturated air at 150° F. will be obtained with .0501 lb. of liquid water present in it.

If thermal efficiency is considered important, rather than add relatively cool 70° F. dry air to dilute the steam, it is possible to add higher temperature uncondensed and non-condensible vapor drawn from the steam box 12. This reduces the overall steam requirement. If a heating surface of approximately 170° F. is to be maintained and the uncondensed and non-condensible vapor leaving steam box 12 is at 165° F., only 0.0746 lb. of 24.25 p.s.i.a. steam would have to be added per pound of recycled air. In this case, saturated steam at 24.25 p.s.i.a. could be added to the apparatus and liquid water at 165° F. could be withdrawn through the condensate collection pipes 50.

Figure 8:
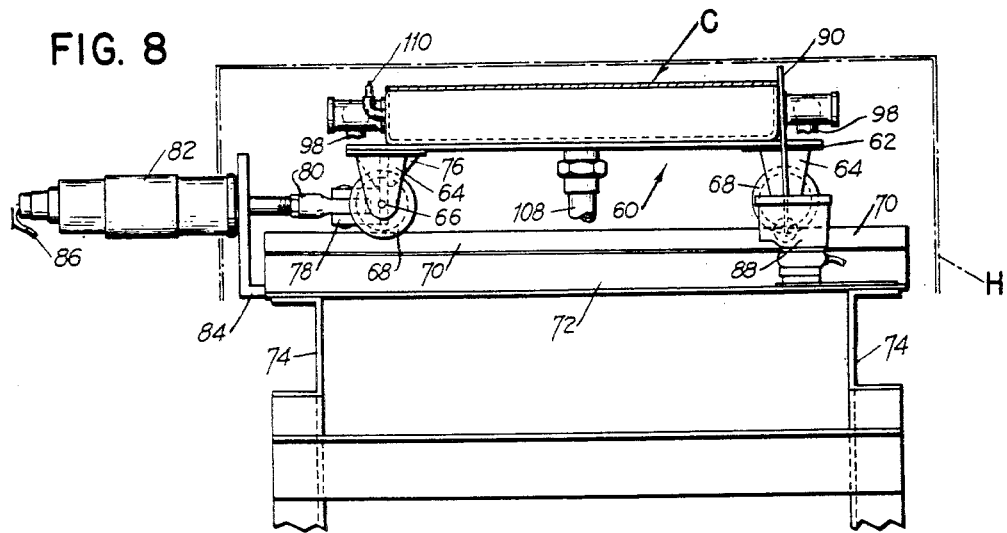
FIG. 8 is an end elevation of the modified steam box and ban conveyor tracking structure shown in FIG. 6.
Figure 9:
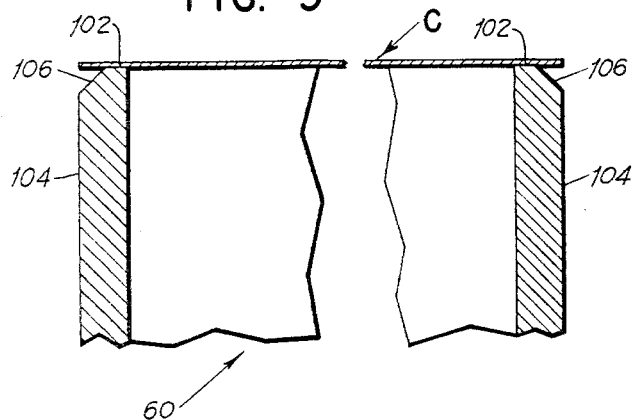
FIG. 9 is a partial sectional end elevation illustrating the upper side edges of the steam box shown in FIG. 6 in conjunction with the band conveyor passing over same.

The modified steam box 60 illustrated in FIGS. 6, 7, 8 and 9 is similar to the box 12 shown in FIGS. 1, 2, 3 and 4 with the exception that it is mounted on a pair of spaced transverse bars 62, each of which at their outer end is provided with a pair of downwardly projecting forked bearing brackets 64 (FIGS. 7 and 8). Each bracket 64 supports a suitable horizontal shaft 66 on which is mounted a shaped wheel 68. Each pair of wheels 68 supporting each transverse bar 62 engages with a shaped transverse track 70. Each track is supported and secured to a cross beam 72 which in turn is mounted on the longitudinal frame structure 76. By supporting the steam box 60 on wheels engaging with transverse tracks, the steam box is provided with means to move freely in a lateral direction.

A downward projecting bracket 76 is secured to the central bottom portion on one side of the steam box 60. The outer face of the bracket 76 has mounted thereon a horizontally projecting fork 78 which pivotally engages with the end of a piston rod 80 projecting from a suitable piston (not shown). The piston is mounted within a horizontal air cylinder 82 secured to a bracket 84 which is mounted on the frame structure 74. The air cylinder 82 is connected by a tube 86 to a position transmitter 88 mounted on the frame structure 74 adjacent the rear end of the steam box 60.

A position indicator arm 90 projects from the transmitter 88. With its free end the arm 90 contacts and engages with one side edge 92 of the endless band conveyor C which passes over the steam box 60 in the same manner as shown and described heretofore in the preferred embodiment of the invention. Since the indicator arm 90 is in constant contact with the side edge of the passing conveyor band C, any lateral sway of the latter causes a corresponding movement of the indicator arm which in turn activates a valve positioner within the position transmitter 88. The latter, of course, is employed for the purpose of transmitting movement via tube 86 to the air cylinder 82 which in turn reacts upon the piston within causing the piston rod 80 to move in or out of the cylinder. Since the end of the piston rod is connected to the carriage of the steam box 60, the latter follows the precise lateral movement of the band conveyor and remains in alignment with the same at all times. Both the air cylinder and the position indicator are conventional.

The second steam box 60 like the first stem box 12 is provided with transverse tubes 94 which are suitably connected to each other by pipes 96 which in turn are connected by a pipe 98 to a source of steam (not shown). The transverse tubes 94 within the steam box 60 are provided with a plurality of jets or nozzles 100 for directing the steam towards the lower side of the passing conveyor band C.

In order to prevent any condensation which may form on the underside of the band from coming over the top side edges of the steam box and onto the top side of the band, the outer top edges 102 of the longitudinal sides 104 (FIG. 9) are provided with a downward sloping bevel 106 which deflects condensation creeping over the top edges of the box sides downward on the outside of the box. The steam box 12 is also provided at its bottom portion with a pair of suitable condensate collection pipes 108 which guide any condensation out of the steam box. To permit the air to escape from the steam box 12 a pair of suitable vent valves 111 are provided and mounted on one side of said box. The modified steam box structure is surrounded by the same type of downdraft suction housing H illustrated in FIGS. 1, 2, 3 and 4.

The second modified steam box 110, as shown in FIGS. 10 and 11, is positioned within a downdraft suction housing H which may be substantially identical to that shown in FIGS. 1, 2, 3 and 4. The steam box 110 has two longitudinal lower wall members 112 between which there is fixed the bottom plate 114. The longitudinal bottom wall members 112 are fixed by pairs of suitable brackets 116 to the horizontal frame members 18. Extending upward from the lower wall members 112 are the two longitudinal flexible wall members 118 which may be made from rubber impregnated canvas or any other suitable flexible material which is resistant to steam. Fixed along the top of the flexible wall members 118 are the conveyor contact strips 120 over which the conveyor belt C passes. The conveyor contact strips 120 may be made of brass, nylon, "Teflon," or any other suitable material.

Supported between the bottom wall members 112 are the transverse tubes 122 which are connected to a longitudinal pipe 124 at their center portions. The pipe 124 projects from steam box 110 and is connected to a suitable steam supply. Each transverse tube 122 is provided with a plurality of jets or nozzles 128 which eject streams of steam against the underside of the band conveyor C as the latter passes over them.

At least two brackets 130 are fixed to the ends of each conveyor contact strip 120. Rotatably secured within each bracket 130 is a tracking roller 132 which bears against the outer edges of belt C. The lateral swaying motion of the conveyor C is transmitted to the tracking rollers 132. The flexible wall members 118 sway from side to side allowing the conveyor contacting strips 120 to move laterally and remain aligned with conveyor C.

As shown in FIG. 11, an end wall 134 extends upward from the bottom plate 114 at each end of the longitudinal lower wall members 112 and the flexible wall members 118. Each end wall 134 has an upper portion 136 formed of "Teflon" or the like which contacts the underside of conveyor belt C. Each end wall 134 and its upper portion 136 is positioned beyond and against the ends of the lower wall members 112, the flexible wall members 118 and the conveyor contact strips 120 so that the flexible wall members 118 and the conveyor contact strips 120 may move relative to the end walls 134 and keep steam box 110 from leaking.

There has thus been described a heating method and apparatus which uses the heat released by a condensing vapor on a moving surface to effect drying and similar operations.

What is claimed is:

1. A method of drying lamina material by heating the underside of a conveyor belt carrying such material to be dried comprising the steps of
    (a) supplying a predetermined quantity of saturated steam
    (b) supplying a predetermined quantity of air at a temperature below that of said steam
    (c) combining said saturated steam with said air to produce saturated air, and
    (d) impinging the saturated air by ejection through a nozzle onto the surface of the underside of said conveyor belt to be heated thereby to effect heat transfer and movement of said saturated air and resultant condensation on said surface.

2. The process according to claim 1 wherein the saturated steam is mixed with dry air.

3. The process according to claim 1 wherein saturated steam is mixed and diluted with air producing saturated air with a liquid water content.

References Cited by the Examiner

UNITED STATES PATENTS

| | | | |
|---|---|---|---|
| 1,770,320 | 7/1930 | Morterud | 165—108 |
| 2,097,602 | 11/1937 | Rohlin | 165—174 |
| 2,155,453 | 4/1939 | Stuntz | 99—204 |
| 2,747,583 | 5/1956 | Frankenburg et al. | 34—216 |
| 2,887,390 | 5/1959 | Coulter et al. | 99—199 |

FREDERICK L. MATTESON, JR., *Primary Examiner.*

CHARLES SUKALO, *Examiner.*

S. W. MILLARD, *Assistant Examiner.*